May 23, 1939.  J. E. HICKS  2,159,851
CONTINUOUS FEEDING MECHANISM
Filed Dec. 19, 1936  2 Sheets—Sheet 1
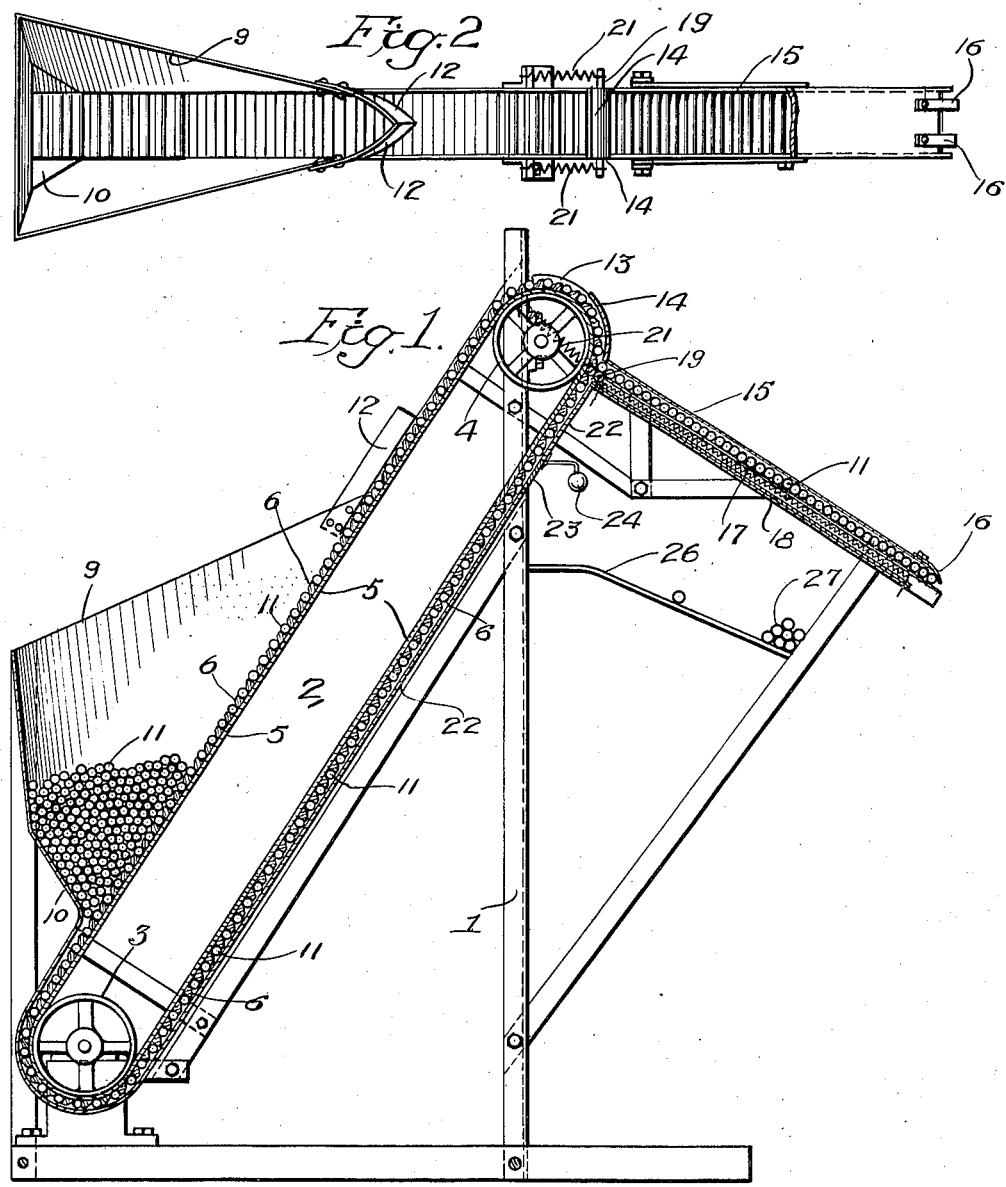
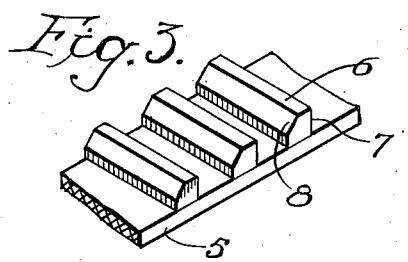
Inventor:—
James E. Hicks
by his Attorneys
Howson & Howson

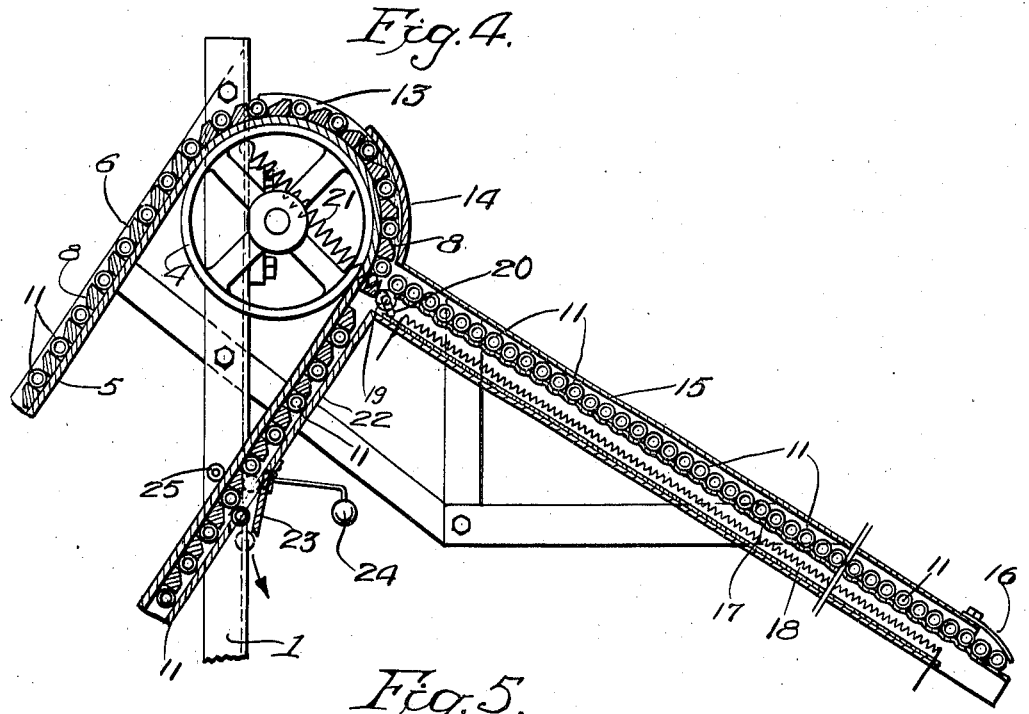
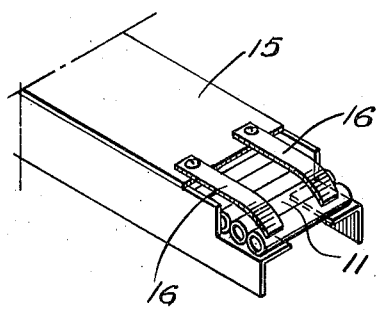

Patented May 23, 1939

2,159,851

UNITED STATES PATENT OFFICE 2,159,851

CONTINUOUS FEEDING MECHANISM

James E. Hicks, Newark, Del., assignor to Continental-Diamond Fibre Company, Newark, Del., a corporation of Delaware Application December 19, 1936, Serial No. 116,796

12 Claims. (Cl. 198—48)

This invention relates to a novel apparatus for feeding cylindrical pieces or the like and more particularly to an apparatus for feeding such pieces to a chute wherein the pieces may be heat treated prior to removal. The invention is applicable, for example, to the handling of short tubes or rods formed of any suitable material such as Bakelite or resin-impregnated fibrous material. A typical example of the application of the invention is the handling of so-called "R. F. coil forms" for radio receivers. Such forms are in general from ½ inch to 1¼ inch in diameter and vary in length from about 1½ inches to about 3 inches. In any case where the material is of such character that it requires heat treatment, the pieces may be heated in the chute to which they are fed as described more particularly hereinafter.

The principal object of the invention is to provide an apparatus of the stated character which is adapted to operate continuously and is adapted to feed pieces into the chute as fast as the pieces in the chute are removed. By virtue of the novel features hereinafter described and claimed, the apparatus operates smoothly regardless of the rate of removal of the pieces from the chute.

A more specific object of the invention is to provide a conveyor adapted to carry cylindrical pieces or the like to a chute and having associated therewith means for insuring proper disposition of the pieces on the conveyor, and means enabling the conveyor to carry the pieces continuously until there is space in the chute to receive them.

Another object of the invention is to provide means for preventing the pieces from jamming at the entrance of the chute.

Still another object of the invention is to provide means for causing the ejection of pieces from the conveyor whenever two pieces become caught between adjacent flights of the conveyor.

Other objects and features of the invention will appear hereinafter. The invention may be clearly understood by reference to the accompanying drawings illustrating a preferred form thereof.

In the drawings:

Fig. 1 is a sectional elevation of the apparatus;

Fig. 2 is a plan view of the apparatus;

Fig. 3 is a fragmentary perspective view illustrating a portion of the conveyor;

Fig. 4 is an enlarged fragmentary sectional view of the upper part of the apparatus illustrating more clearly certain novel features; and Fig. 5 is a perspective view illustrating more clearly the lower end portion of the chute.

Referring particularly to Fig. 1, the apparatus comprises a supporting framework designated generally by reference character 1. The conveyor is shown generally at 2 and comprises a lower wheel or pulley 3, an upper wheel or pulley 4, and a continuous belt or the like 5 passing about the wheels or pulleys and being driven by any suitable means (not shown) such as a motor arranged to drive the lower wheel. Preferably, the driving means may comprise a motor and a speed-reducing device adapted to drive the conveyor belt at a suitable speed, such as a speed of nine feet per minute. The conveyor belt is inclined at a predetermined angle which should preferably be approximately 58° relative to the horizontal. The conveyor belt carries spaced flights 6, as shown more clearly in Fig. 3. These flights extend transversely of the conveyor belt and each flight is formed to provide a flat surface 7 for carrying a cylindrical piece in transverse disposition on the conveyor and an inclined surface 8 over which the piece may roll when it reaches the top of the conveyor, as will be more clearly understood later.

A hopper 9 is arranged cooperatively with the conveyor, as shown in Figs. 1 and 2, and is adapted to receive the cylindrical pieces and to feed the pieces onto the conveyor. In furtherance of this purpose, the hopper is shaped as illustrated and there is provided a guide 10 comprising an inclined wall which serves to position the pieces on the conveyor flights. The pieces are fed into the hopper and fall generally in proper position upon the conevyor flights, some of them rolling or sliding along the guide 10 onto the conveyor flights. In the illustration of Fig. 1, the hopper 9 is shown partially filled with the cylindrical pieces 11 and the conveyor is completely filled with the pieces even on its reverse side. This condition will exist at times during the operation of the apparatus, the ability of the conveyor to carry the pieces through repeated cycles being a characteristic feature of the device.

In order to insure the proper positioning of the cylindrical pieces on the conveyor so that the pieces may be fed in the manner described hereinafter, there are provided at the upper end of the chute 9 a pair of flexible guard members 12 which are disposed immediately adjacent the conveyor and extend convergently transversely of the conveyor, as clearly shown in Figs. 1 and 2. Any of the cylindrical pieces which may be improperly positioned on the conveyor are carried up to the guard members which serve to remove or tumble such pieces from the conveyor, causing them to return gravitationally to the hopper. The flexibility or resilience of the guard members enables them to give somewhat and prevents jamming. These members may be formed of resilient metal or any other suitable material. Pieces which are properly positioned on the conveyor pass beneath the guard members and are undisturbed thereby.

At the top of the conveyor, there are provided rigid side guides 13 which serve to center the cylindrical pieces on the conveyor. There is also provided a guide 14 which prevents the pieces from falling off the conveyor after they have passed over the top thereof. At the reverse side of the conveyor just below the top thereof, there is provided a chute 15 which extends downwardly from the conveyor at a predetermined angle thereto. The guide 14 extends down to the entrance of the chute, as clearly shown in Fig. 4. After the pieces have passed over the top of the conveyor, they tend to roll over the inclined surfaces 8 of the conveyor flights. The guide 14 prevents this until the successive pieces reach the entrance of the chute 15. If there is space within the chute, the pieces enter the same but if the chute is completely filled as illustrated, the pieces are maintained in position on the conveyor and are carried thereby through another cycle of operation. At the lower end of the chute, there are provided a pair of spring fingers 16 as shown more clearly in Fig. 5, which serve to maintain the pieces within the chute until they are removed manually. The bottom 17 of the chute is preferably provided with corrugational recesses, as shown in Fig. 4, adapted to seat the successive pieces but permitting the pieces to roll down the chute from one seating recess to another as the lowermost pieces are removed. Thus passage of the cylindrical pieces downwardly through the chute is substantially retarded and said pieces are maintained in relatively spaced parallel relation so that they reach the bottom of the chute one at a time permitting relatively easy manual withdrawal of the pieces therefrom which would not be possible if a number of said pieces were allowed to bunch together at the chute outlet.

Since the apparatus is particularly adapted for the handling of pieces which are to be heat treated, there is associated with the chute a heating element 18 which extends substantially the length of the chute, as shown in Fig. 4. Thus, a substantial number of the pieces may be heated at one time while they are in the chute 15, enabling the feeding of successive batches into the chute and the heat treatment of the successive batches, the conveyor operating continuously all the while. It will be understood, of course, that where it is desired to merely feed the pieces into the chute without heat treating them, the heating element may be dispensed with.

In order to prevent jamming of the pieces at the entrance of the chute, there is provided a roll 19 which is slidably mounted within slots 20 in the side walls of the chute and is resiliently maintained in position by springs 21. Normally, the surface of roll 19 is aligned with the bottom of the chute by the action of the springs 21. If one of the pieces on the conveyor reaches the entrance of the chute just as the pieces within the chute have started to roll down the chute, there is a tendency for the pieces to jam at the chute entrance. The resiliently mounted roll 19 prevents this by moving sufficiently to release the jammed piece and forcing it back onto the conveyor.

In order to maintain the pieces on the reverse side and bottom of the conveyor, there is provided a guide 22 which extends along the reverse side of the conveyor and beneath the bottom thereof, as shown clearly in Fig. 1. Although the conveyor flights are spaced apart sufficiently to accommodate only one piece between two adjacent flights, at times two pieces may be caught between adjacent flights as the conveyor passes the chute entrance. This is possible because the conveyor belt is necessarily flexible and may be pressed inwardly away from the guide 22 by two pieces thus caught or jammed, thus enabling two pieces to become lodged in the space between adjacent flights. In order to eject one or both of such pieces, there is provided a trap door 23 which is normally maintained in closed position by the counterbalancing weight 24. Opposite the trap door, there is provided a stationary roll 25 which prevents the conveyor belt from being forced inwardly at that point. When the two pieces above mentioned reach the trap door, they force it open against the action of its weight and one or both of the pieces are thus caused to drop from the conveyor onto the runway 26 (see Fig. 1), the pieces which are thus dropped being collected in a group as indicated at 27. In Fig. 4, this action is depicted and the path of travel of the ejected pieces is shown by the arrow.

From the above description, it will be seen that the apparatus embodies novel features which enable smooth operation and which enable the conveyor to supply the chute constantly. Except for the feeding of the pieces into the hopper 9 and the removal of the pieces from the chute, the operation of the apparatus is entirely automatic and the device is adapted to prevent abnormal conditions which may occur.

Although a specific preferred embodiment of the device has been illustrated and described for the purpose of disclosure, it will be understood that various modifications are possible within the scope of the invention. It will be apparent also that the invention is capable of use in any instance where it is desired to handle pieces of generally cylindrical form irrespective of the specific character of the pieces or the material of which they are formed.

I claim:

1. In an apparatus for feeding cylindrical pieces, a conveyor disposed at a predetermined angle, flights on said conveyor for carrying said pieces successively to the top of the conveyor, said flights extending transversely of the conveyor and adapted to carry said pieces in transverse disposition, a hopper adjacent the lower part of said conveyor for feeding said pieces onto said conveyor, and means comprising a pair of flexible convergent guard members extending transversely of the upper part of said conveyor out of the path of the flights for causing improperly positioned pieces to fall gravitationally back into said hopper while permitting free passage therebeneath of said flights and pieces properly positioned and carried thereby.

2. In an apparatus for feeding cylindrical pieces, a conveyor disposed at a predetermined angle, flights on said conveyor for carrying said pieces successively to the top of the conveyor, said flights extending transversely of the conveyor and each flight having a surface for carrying a piece in transverse disposition and an inclined surface over which the piece may roll when it reaches the top of the conveyor, a chute extending downwardly from the upper part of the conveyor on the reverse side thereof, means at the top of the conveyor for maintaining said pieces on the conveyor until they reach the entrance of said chute, means at the lower end of said chute for maintaining the pieces therein while permitting manual removal of the pieces, and a resiliently mounted roll at the entrance of said chute for preventing the pieces from jamming.

3. In an apparatus for feeding cylindrical pieces, a conveyor disposed at a predetermined angle, flights on said conveyor for carrying said pieces successively to the top of the conveyor, said flights extending transversely of the conveyor and each flight having a surface for carrying a piece in transverse disposition and an inclined surface over which the piece may roll when it reaches the top of the conveyor, a chute extending downwardly from the upper part of the conveyor on the reverse side thereof, means at the top of the conveyor for maintaining said pieces on the conveyor until they reach the entrance of said chute, means at the lower end of said chute for maintaining the pieces therein while permitting manual removal of the pieces, means at the reverse side and bottom of said conveyor for maintaining thereon pieces which are unable to enter said chute, and means associated with the last mentioned means automatically operative to permit pieces to leave said conveyor whenever two pieces become caught between adjacent flights of the conveyor.

4. In an apparatus for feeding cylindrical pieces, a conveyor disposed at a predetermined angle, flights on said conveyor for carrying said pieces successively to the top of the conveyor, said flights extending transversely of the conveyor and each flight having a surface for carrying a piece in transverse disposition and an inclined surface over which the piece may roll when it reaches the top of the conveyor, a chute extending downwardly from the upper part of the conveyor on the reverse side thereof, means at the top of the conveyor for maintaining said pieces on the conveyor until they reach the entrance of said chute, means at the lower end of said chute for maintaining the pieces therein while permitting manual removal of the pieces, a guide at the reverse side and bottom of said conveyor for maintaining thereon pieces which are unable to enter said chute, and a counterbalanced trap door on said guide for allowing pieces to leave said conveyor whenever two pieces become caught between adjacent flights of the conveyor.

5. In an apparatus of the character described, a conveyor arranged to carry substantially cylindrical pieces, a chute declining from said conveyor adjacent one end thereof, and a resiliently mounted roll at the entrance of said chute for preventing the pieces carried by said conveyor from jamming therein.

6. In an apparatus for feeding cylindrical pieces, a conveyor disposed at a predetermined angle, flights on said conveyor for carrying said pieces successively to the top of the conveyor, a chute extending downwardly from the upper part of the conveyor on the reverse side thereof, and a resiliently mounted roll at the entrance of said chute for preventing the pieces from jamming.

7. In an apparatus of the character described, a conveyor arranged to carry substantially cylindrical pieces, a chute declining from said conveyor adjacent one end thereof, a resiliently mounted roll at the entrance of said chute for preventing the pieces carried by said conveyor from jamming therein, and means including at least one spring finger at the lower end of said chute for maintaining the pieces therein while permitting manual removal of said pieces.

8. In an apparatus for feeding cylindrical pieces, a conveyor disposed at a predetermined angle, flights on said conveyor for carrying said pieces successively to the top of the conveyor, a chute extending downwardly from the upper part of the conveyor on the reverse side thereof, a guide at the reverse side and bottom of said conveyor for maintaining thereon pieces which are unable to enter said chute, and a counterbalanced trap door on said guide for allowing pieces to leave said conveyor whenever two pieces become caught between adjacent flights of the conveyor.

9. In an apparatus for feeding cylindrical pieces, a conveyor disposed at a predetermined angle, flights on said conveyor for carrying said pieces successively to the top of the conveyor, a chute extending downwardly from the upper part of the conveyor on the reverse side thereof, a guide at the reverse side and bottom of said conveyor for maintaining thereon pieces which are unable to enter said chute, a counterbalanced trap door on said guide for allowing pieces to leave said conveyor whenever two pieces become caught between adjacent flights of the conveyor, and means at the lower end of said chute for maintaining the pieces therein while permitting manual removal of said pieces.

10. In an apparatus for feeding cylindrical pieces, a conveyor disposed at a predetermined angle, flights on said conveyor for carrying said pieces successively to the top of the conveyor, a chute extending downwardly from the upper part of the conveyor on the reverse side thereof, a guide at the reverse side and bottom of said conveyor for maintaining thereon pieces which are unable to enter said chute, and means associated with the last-mentioned means automatically operative to permit pieces to leave said conveyor whenever two pieces become caught between adjacent flights of the conveyor.

11. In an apparatus of the character described, a conveyor arranged to carry substantially cylindrical pieces, a transversely corrugated chute declining from said conveyor adjacent one end thereof, and a resiliently mounted roll at the entrance of said chute for preventing the pieces carried by said conveyor from jamming therein.

12. In an apparatus for feeding cylindrical pieces, a conveyor disposed at a predetermined angle, flights on said conveyor for carrying said pieces successively to the top of the conveyor, a transversely corrugated chute extending downwardly from the upper part of the conveyor on the reverse side thereof, a guide at the reverse side and bottom of said conveyor for maintaining thereon pieces which are unable to enter said chute, a counterbalanced trap door on said guide for allowing pieces to leave said conveyor whenever two pieces become caught between adjacent flights of the conveyor, and means at the lower end of said chute for maintaining the pieces therein while permitting manual removal of said pieces.

JAMES E. HICKS.